(12) United States Patent
Dumoulin et al.

(10) Patent No.: US 8,660,722 B2
(45) Date of Patent: Feb. 25, 2014

(54) METHOD FOR OPTIMIZING AIRCRAFT LANDING ON A RUNWAY

(75) Inventors: Anne Dumoulin, Toulouse (FR); Martin Scheuermann, Merville (FR)

(73) Assignees: Airbus (SAS), Blagnac Cedex (FR); Airbus Operations (SAS), Toulouse Cedex (FR)

(*) Notice: Subject to any disclaimer, the term of this patent is extended or adjusted under 35 U.S.C. 154(b) by 98 days.

(21) Appl. No.: 13/412,876

(22) Filed: Mar. 6, 2012

(65) Prior Publication Data

US 2012/0232725 A1  Sep. 13, 2012

(30) Foreign Application Priority Data

Mar. 8, 2011 (FR) .................................... 11 51865

(51) Int. Cl.
*G01D 1/00* (2006.01)
*G01D 1/06* (2006.01)

(52) U.S. Cl.
USPC .................................. 701/16; 701/18; 701/17

(58) Field of Classification Search
USPC .................. 701/3, 16–18, 7, 5; 342/407, 410; 340/971–974, 976–980
See application file for complete search history.

(56) References Cited

U.S. PATENT DOCUMENTS

| | | | | |
|---|---|---|---|---|
| 4,638,437 A | * | 1/1987 | Cleary et al. | 701/15 |
| 4,925,303 A | * | 5/1990 | Pusic | 356/139.03 |
| 5,111,403 A | * | 5/1992 | Orgun et al. | 701/16 |
| 5,337,982 A | | 8/1994 | Sherry | |
| 2009/0050746 A1 | | 2/2009 | Dal Santo et al. | |

OTHER PUBLICATIONS

French Patent Office, French Search Report FR 1151865 (2 pgs), Feb. 6, 2012.

* cited by examiner

*Primary Examiner* — Yonel Beaulieu
(74) *Attorney, Agent, or Firm* — Wood, Herron & Evans, LLP

(57) ABSTRACT

A target vertical speed, to be applied to the aircraft upon the initiation of the aircraft's flaring phase, is defined in relation to the ground. An optimized ground slope associated with an approach path to be tracked during the landing, is then determined as a function of the determined target vertical speed and of at least one outside parameter. This optimized ground slope is at least equal to a predefined ground slope. Upon interception by the aircraft with the approach path, the aircraft is guided to track the determined optimized ground slope associated with the approach path and reach the target vertical speed upon initiation of the flaring phase.

15 Claims, 2 Drawing Sheets

METHOD FOR OPTIMIZING AIRCRAFT LANDING ON A RUNWAY

TECHNICAL FIELD

The present invention relates to a method for optimizing the landing of an aircraft on a runway, as well as a corresponding optimization device.

BACKGROUND

As known, according to standard procedure rules, an aircraft (for instance a civil transport airplane) switches from a descent start altitude to a final approach start altitude:

either while carrying out a descent at a constant speed, followed by a defined approach level, for instance, by an altitude of 3,000 feet (that is about 914 meters), for decelerating and then stabilizing at a predetermined intermediary speed, the aircraft maintaining this level, with this intermediary speed, until it intercepts a predefined final approach path $A_i$; or while carrying out a continuous descent approach, wherein the deceleration level at a constant altitude is omitted, so that the aircraft descends and decelerates simultaneously, this step being optimally divided into several sections each having specific descent slopes.

Intercepting the approach level, or the last segment of the approach in a continuous descent, and the approach path defines the initiation of the final approach phase.

The standard slope associated with this approach path and defined in relation to the ground (the reason why it will be referred to as "ground slope" later on) is usually set at −3°. During the approach phase, the aircraft decelerates again, keeping track of the approach path, while spreading the slats, the flaps and the landing gears, so as to exhibit a landing configuration. At approximately 1000 feet (that is about 305 meters), the aircraft keeps a stabilized approach at a predefined approach speed (being, more specifically, a function of the configuration of the aircraft and of the meteorological conditions) up to 50 feet (that is about 15 meters), and then initiates its flare so as to join the runway and complete the landing.

It is known as well that, in order to avoid obstacles (for instance formed by the relief, buildings, etc.), an increased ground slope approach phase (that is for instance, switching from a −3° standard ground slope to a −4° ground slope) could be carried out. It should be noticed that, whatever the final ground slope to track, the latter is published in the operational approach procedures as defined by the air authorities.

It is also known that, in addition to air safety considerations, an increased ground slope approach phase enables to reduce the environmental impacts in the vicinity of airports (including noise and polluting emissions), as, thru the geometric structure, the aircraft flies higher for a same distance to the threshold of the runway and that the motor speed necessary to maintain this slope is lower in general. This explains why the different actors of the aeronautic field (aircraft manufacturers, airports, air companies) are eager to develop increased ground slope approaches.

Furthermore, it is known that transport civil dedicated aircrafts generally carry out their final approach on a ground slope set at −3°, while being certified for flying up to −4.49° ground slopes. Beyond this slope value, the approach phase is considered, by the international rules, as an approach on a steep slope and the aircraft should suit additional certification requirements.

Although such increased ground slopes (that is higher than −3° but lower than −4.5°) are regularly followed on numerous international airports, in order to avoid obstacles, it is not usual for the aircraft to land abruptly (this is referred to, in such a case, as a "hard" landing), comprising the good behaviour of the aircraft, especially when such hard landings are daily occurring.

In other words, in order to stand up to regular increased ground slope approaches (equal for instance to −4°), it is indispensable to review the design criteria of the aircraft in terms of performance, maneuverability, or even of structure, so as to ensure a secured landing, whatever the characteristics of the aircraft, the meteorological conditions and the geographical situations in the vicinity of airports.

Indeed, increasing the ground slope during a final approach results, on the one hand, in an increase of the vertical speed of the aircraft in relation to the ground (also referred to as "ground vertical speed" subsequently) and, on the other hand, in a decrease of the deceleration abilities of the aircraft (at the origin of hard landings). It can, for instance, be shown that, in the case of a conventional speed Vgs, a −1° increase of a ground slope initially at −3° (that is an increased ground slope equal to) −4° could result in the vertical speed Vz increasing By more than 30%.

An increase of the ground slope (and thus of the vertical ground speed) involves a review of maneuverability and deceleration abilities, even redimensioning landing gears, resulting in an additional embedded load, important modifications of the systems of the aircraft, as well as the need of an adapted training of pilots.

The present invention aims at solving these drawbacks.

To this end, according to this invention, the method for optimizing the landing of an aircraft on a runway, said landing comprising an approach phase, defined by an approach path to be tracked with which a predefined ground slope is associated, and a flaring phase, is remarkable in that:

in a preliminary step:
a target vertical speed in relation to the ground to be applied to said aircraft upon the initiation of the flaring phase is defined on the basis of performances and characteristics specific to said aircraft; and
as a function of said target vertical speed and of at least one outside parameter, an optimized ground slope, associated with the approach path, is determined which is higher than or equal to the predetermined ground slope, and
as soon as the approach path is intercepted by the aircraft, said aircraft is guided so as to track the determined optimized ground slope, associated with said approach path, and to reach the previously defined target vertical speed at the initiation of the flaring phase.

Thus, thanks to this invention, the ground slope of the approach path is optimized, during the approach phase, while determining an optimized ground slope (with respect to the ground slope issued from standard procedure rules) from a target vertical speed predefined, based on characteristics being specific to the aircraft and one or more outside parameters, such as those associated with meteorological conditions, environmental conditions and characteristics specific to the aircraft.

Indeed, it has been shown that the flare carried out upon a landing of an aircraft depends nearly exclusively on the ground vertical speed of the aircraft, so that is forms an efficient parameter for characterizing the flare and provides an indication on the ability of the aircraft to ensure a secured landing and to avoid an inappropriately throttling up. The present invention is advantageously based on the fact that the above mentioned outside parameters disturb the deceleration abilities of the aircraft, at a set ground slope, and increase the risk that the aircraft should abruptly land on the runway, so that taking the latter into consideration in the calculation of the optimized ground slope enables to reduce the risk of hard landings.

In other words, setting the ground vertical speed of the aircraft upon the initiation of the flare (at about 50 feet) to a preliminarily defined nominal target value, the present invention will secure the final approach phase, providing a more constant, repeated and easier flare, while increasing the slope, making advantageously use of the conditions of the approach being considered for improving the environmental aspects, without imposing new designing constraints.

The higher the ground slope of the approach, the lower the motor speed of the aircraft along the approach path, reducing the atmospheric and sound pollution, as well as the fuel consumption of the aircraft.

In addition, the optimizing method of the present invention also has the advantage of being able to be implemented:
  readily in any aircraft;
  without any structural modification of the aircraft;
  without modification of the piloting laws or of the aerodynamic configuration of the aircraft;
  without modification of operational procedures;
  without impact on the air traffic control;
  without modification of the airport facilities on the ground; and
  without additional certification specific to this concept.

Preferably, the outside parameter(s) belong to the group of parameters comprising:
  the calibrated airspeed CAS of the aircraft with respect to the air. This speed CAS is a function of the bulk of the aircraft and of the flight configuration of the aircraft associated with the approach phase, so that, involving the speed CAS in the determination of the optimized slope, these last two parameters (bulk M, flight configuration) are taken into consideration;
  the outside temperature at a standard height;
  the horizontal speed of the wind;
  the inclination of the runway with respect to the horizontal; and
  the altitude of the runway.

Preferably, the optimized ground slope is determined from the target vertical speed, the calibrated airspeed CAS, the horizontal speed of the wind, the outside temperature at a standard height, as well as from the inclination and the altitude of the runway.

In addition, the horizontal speed of the wind, taken into consideration during the determination of the optimized ground slope, belongs to a determined range of values able to be obtained from several technological solutions.

Furthermore, for determining the optimized ground slope preferably the following steps are carried out:
  the density of the air at the standard height is determined from the outside temperature and from the altitude of the runway;
  the true speed TAS of the aircraft with respect to the air is determined from the speed CAS and from the determined density of the air;
  the optimized ground slope is determined from the target vertical speed, from the determined true speed TAS, from the horizontal speed of the wind and from the inclination of the runway.

In a particular embodiment, the determination of the optimized ground slope is obtained thru geometric construction of a speed triangle.

Moreover, the target vertical speed could be defined preliminarily for each type of aircraft.

So as not to decrease the safety margins imposed by the air safety authorities, the optimized ground slope ranges between a predefined lower extreme value and a predefined higher extreme value, preferably equal respectively to −3° and to −4.49°.

Furthermore, the horizontal speed of the wind could be obtained according to at least one of the following ways:
  thru measurement of the wind at the level of the control tower of the runway being considered, without taking gusts into consideration;
  thru retrieving data measured directly by one or more other aircrafts located in the vicinity of the runway.

The present invention further relates to a device for optimizing the landing of an aircraft on a runway, said landing comprising an approach phase, defined by an approach path to be tracked with which a predefined ground slope is associated, and a flaring phase. According to this invention, such a device comprises:
  means for determining, as a function of at least one outside parameter and of a target vertical speed, preliminarily defined from performances and characteristics being specific to said aircraft, an optimized ground slope associated with the approach path to be tracked being higher than or equal to the predefined ground slope; and
  means for guiding the aircraft as soon as the latter intercepts the approach path, so that it can track the determined optimized ground slope associated with said approach path, and it reaches the preliminarily defined target vertical speed during the initiation of the flaring phase.

Moreover, as the optimized ground slope is determined from said target vertical speed, the calibrated airspeed CAS, the horizontal speed of the wind, the outside temperature at a standard height, as well as the inclination and the altitude of the runway, said determination means preferably comprise:
  means for calculating the density of the air at the standard height as a function of the outside temperature and of the altitude of the runway;
  means for calculating the true speed TAS of the aircraft with respect to the air from the speed CAS and from the determined density of the air; and
  means for calculating the optimized ground slope from the target vertical speed, from the determined true speed TAS, from the horizontal speed of the wind and from the inclination of the runway.

BRIEF DESCRIPTION OF THE DRAWINGS

Furthermore, the present invention further relates to an aircraft comprising a device such as specified hereinabove.

The FIGS. of the appended drawings will better explain how this invention can be implemented. In these FIGS., like reference numerals relate to like components.

DETAILED DESCRIPTION

Figure 1:
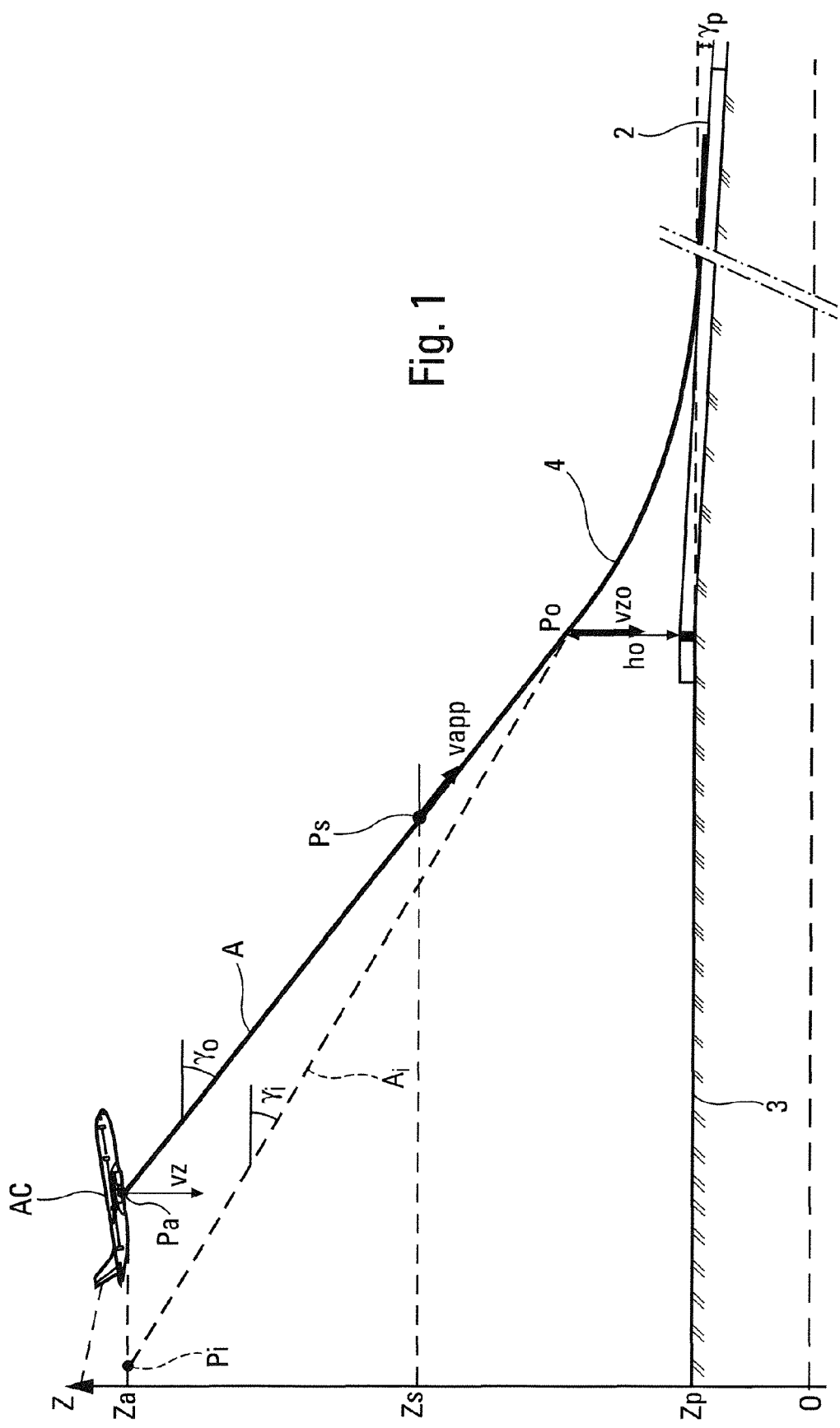
FIG. 1. represents a diagram showing the method according to the present invention.

In the situation schematically shown on FIG. 1, an aircraft AC is in an approach phase, with the aim to land on a runway 2 located at an altitude Zp. After a flight on the altitude approach level Za or after a continuous descent intermediary approach, the aircraft AC intercepts a final approach path A, having an optimized ground slope $\gamma_o$ determined as described subsequently, at point Pa (corresponding to the intersection of the level Za, or of the continuous descent approach segment, and of the approach path A) and descends along said path A in the direction to the runway 2 so as to decelerate until a stabilized approach speed Vapp at a stabilization altitude Zs at about 1000 feet (point Ps) for reaching afterwards the target vertical speed Vzo in relation to the ground 3 being constant at point Po. The latter indicates the start of the flare 4 following the approach phase.

As shown on FIG. 1, the optimized ground slope $\gamma_o$ is higher than the initial ground slope $\gamma_i$ (for instance $\gamma_i=-3°$ and $\gamma_o=-4°$) being determined by standard procedure rules.

Preferably, the optimized ground slope $\gamma_o$ ranges between a lower extreme value (for instance equal to $-3°$) and a higher extreme value, (for instance equal to $-4.49°$), so as not to decrease the safety margins imposed by the air authorities.

According to the present invention, in order to optimize the landing of the aircraft AC on the runway 2, first:
- a target vertical speed Vzo is defined in relation to the ground 3 to be applied to the aircraft AC upon the initiation of the flare. Such a vertical ground speed Vzo is defined from performance and characteristics being specific to the aircraft, for instance thru simulations carrying out performance and robustness calculations. The definition of Vzo results from an acceptable compromise between the safety relating to the flare 4 and the reduction of the (sound and atmospheric) pollution and of the fuel consumption. In the remainder, it is considered that Vzo is independent from the embedded bulk of the aircraft AC, so that Vzo is identical whatever the embedded bulk. Alternatively, it could be contemplated that Vzo depends on the bulk embedded on-board the aircraft, so that Vzo could be determined from embedded bulk/speed Vzo abacuses; and
- the optimized ground slope $\gamma_o$ associated with the approach path A is determined from the target vertical speed Vzo and from outside parameters as detailed hereinafter.

Subsequently, "outside parameters," which refer to the parameters associated with the meteorological conditions, the environmental conditions and the characteristics specific to the aircraft AC, are determined.

In particular, outside parameters able to be involved in determining the optimized ground slope according to this invention include:
- the calibrated airspeed CAS of the aircraft AC with respect to the air; This speed CAS is a function of the bulk M of the aircraft and the flight configuration of the aircraft AC associated with the approach phase. Otherwise stated, using the speed CAS, the bulk M and the flight configuration of the aircraft AC are indirectly taken into consideration. It should further be noticed that the higher the bulk of the aircraft AC upon landing, the higher too the over-all approach speed, resulting in the ground slope decreasing, associated with the path A at the vertical iso speed Vz;
- the outside temperature To at a standard height ho (for instance equal to 50 feet). The temperature T of the ambient air act on the tracked ground slope associated with the path A to the vertical iso speed. If the temperature T is lower than the standard temperature To defined at destination, the tracked ground slope will be finally higher than the initial ground slope $\gamma_i$ and conversely for higher temperatures;
- the altitude Zp of the runway 2. Indeed, the density of the air varies as a function of the altitude of the runway Zp, so that the latter acts directly on the true speed TAS of the aircraft with respect to the air. Thus, the higher the altitude Zp of the airport, the lower the density of the air, so that the more the true speed TAS increases and the tracked ground slope is gentle;
- the inclination $\gamma_P$ of the runway 2 when it is available in the navigation base. The optimized ground slope $\gamma_o$ is directly corrected from this inclination $\gamma_P$, for instance through geometric construction; and
- the horizontal speed of the wind Vw being one of the most influent available parameters in the relationship linking the ground vertical speed of the aircraft and the ground slope associated with the approach path A. When the ground vertical speed Vz of the aircraft AC is set, a front wind easily and instantaneously allows flying along the approach path A with an increased ground slope at iso air slope. The horizontal speed of the wind Vw, used for determining the optimized ground slope according to the method of this invention, could be obtained according to at least one of the following ways:
- thru measurement of the wind at the level of the control tower of the runway 2 without taking gusts into consideration; and/or
- thru retrieval of data measured by one or more other aircrafts located in the surrounding of the runway 2 and transmitted directly to the Aircraft AC.

Several methods for obtaining the horizontal speed of the wind Vw could be used simultaneously for minimizing error measurements. Moreover, a determined range of speed values Vw could be defined, to be taken into consideration upon determining the optimized ground slope $\gamma_o$. In order to maintain some safety margin, only part of the wind could be taken into consideration. For instance, up to 15 kts of front wind, 80% of the wind could be considered. For stronger winds (the speed Vw of which is higher than 15 kts), a lower consideration of the wind could be implemented. Theoretically, the method of this invention enables to achieve a final approach at iso thrust, iso altitude of the aircraft AC and iso vertical speed Vz, whatever the horizontal speed of the wind Vw.

According to this invention, for determining the optimized ground slope $\gamma_o$, the following steps are carried out:
- the density of the air ($\rho_c$) at the standard height ho is determined from the outside temperature To and from the altitude of the runway Zp. More precisely, from the altitude of the runway Zp, the atmospheric pressure P is deduced at the altitude Zp, allowing to calculate the density of the air $\rho_c$ at the standard height ho thru the relationship $$\rho_c = \frac{P}{R \cdot To},$$

where R=287.053 J/kg/m$^3$.
- the true speed TAS of the aircraft is determined with respect to the air from the speed CAS.

Figures 2, 3, 4:
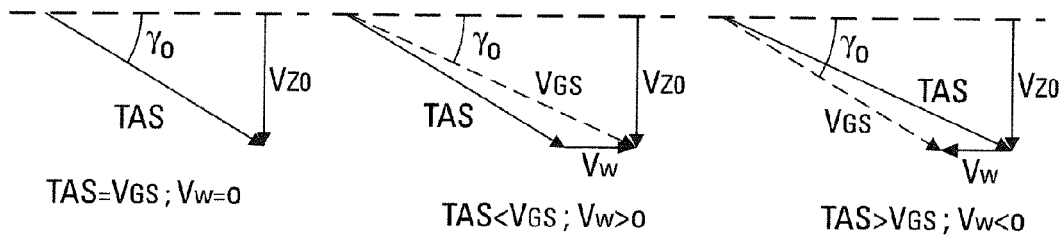
FIG. 2 represents a speed triangle allowing for geometrically determining the optimized slope according to this invention in the case of a lack of wind.
FIG. 3 represents a speed triangle allowing for geometrically determining the optimized slope according to this invention in the case of a back wind.
FIG. 4 represents a speed triangle allowing for geometrically determining the optimized sloe according to this invention in the case of a front wind.

To this end, the calibrated airspeed CAS is retrieved, corresponding to the approach speed being considered. This value is for instance available from the FMS (for Flight Management System). Afterwards, the true speed TAS is determined thru the relationship $$TAS = \sqrt{\frac{\rho_c}{\rho_o}} \cdot K \cdot CAS,$$

where $\rho_o = 1.225$ kg/m$^3$ and K is a coefficient of compressibility correction; and optimized ground slope ($\gamma_o$) is determined from the target vertical speed Vzo, from the determined true speed TAS, from the horizontal speed of the wind Vw and from the inclination of the runway ($\gamma_P$). Such a determination could be obtained in a simplified way thru geometric construction of a speed triangle. Indeed, as shown on FIGS. 3 to 5 (on which the inclination of the runway is nil) presenting respectively the case where there is no wind (Vw=0, FIG. 2), the case where there is some back wind (Vw>0, FIG. 3) and the case where there is a front wind (Vw<0, FIG. 4), thru building a speed triangle from the determined speed TAS and the constant target vertical speed Vzo, the optimized ground slope $\gamma_o$ is obtained. During the absence of wind (FIG. 2), the speed of the aircraft AC in relation to the ground Vgs is equal to the speed TAS (that is TAS=Vgs). In the case of a back wind (FIG. 3), the speed Vgs is higher than the speed TAS (that is TAS<Vgs) and $\gamma_o$ is less high than that obtained in the absence of wind. In the case of a front wind (FIG. 4), the speed Vgs is lower than the speed TAS (that is TAS>Vgs) and $\gamma_o$ is higher than that obtained in the absence of wind.

Thus, after determining the optimized ground slope $\gamma_o$ in the above mentioned way, upon the interception by the aircraft AC of the approach path A at point Pa, the aircraft AC is guided so that it tracks the optimized ground slope $\gamma_o$ associated with the approach path A, and it reaches the target vertical speed Vzo upon the initiation of the flaring phase 4 (point Po).

Figure 5:
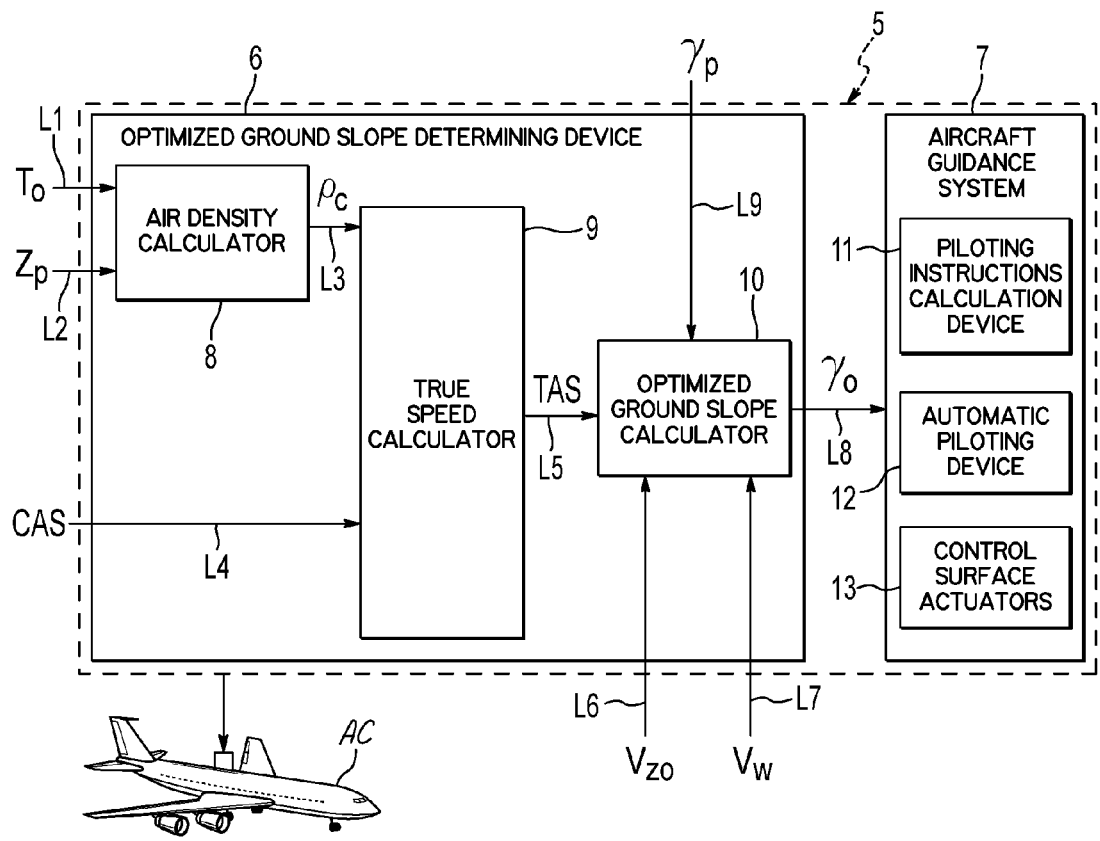
FIG. 5 is a block diagram of a device for implementing the method according to this invention.

For determining the optimized ground slope $\gamma_o$ and guiding the aircraft AC as mentioned hereinabove, the device 5 illustrated on FIG. 5 could be used. It comprises:

an optimized ground slope determination device 6 for determining the optimized ground slope $\gamma_o$, associated with the approach path A to be tracked, receiving the outside temperature To at a standard height ho, the inclination $\gamma_P$ and the altitude Zp of the runway 2, the calibrated airspeed CAS, the target vertical speed Vzo and the horizontal speed of the wind Vw; and an aircraft guidance system 7 for guiding the aircraft upon the interception (point Pa) by the aircraft with the approach path A, for imposing to it to track the associated optimized slope $\gamma_o$ and have it reach the target vertical speed Vzo at point Po.

The optimized grounds slope determination device 6 may comprise:

an air density calculator 8 for calculating the density of the air $\rho_c$ at the standard height ho as defined hereinabove. It receives the outside temperature To and the altitude of the runway Zp, via links L1 and L2. The air density calculator is 8 able to deliver, in outlet, the density of the air $\rho_c$ at the height ho;

a true speed calculator 9 for calculating the true speed TAS of the aircraft AC as set forth previously. It receives the density of the air $\rho_c$ as determined By the air density calculator 8 and the calibrated airspeed CAS, via links L3 and L4. The true speed calculator 9 is able to deliver, in outlet, the true speed TAS; and an optimized ground slope calculator 10 for calculating the optimized ground slope $\gamma_o$ as mentioned hereinabove. It receives the true speed TAS determined by the true speed calculator 9, the target vertical speed Vzo, the horizontal speed of the wind Vw, as well as the inclination of the runway $\gamma_P$ via links L5, L6, L7 and L9. The optimized ground slope calculator 10 is able to deliver, in outlet, the optimized ground slope $\gamma_o$ so that it can be processed by the aircraft guidance system 7.

The optimized ground slope determination device 6 for determining the optimized slope $\gamma_o$ could be integral with the flight management system FMS or with another embedded system in connection with the flight management system. Alternatively, it could be outside the aircraft and have the form of a laptop or be even integrated into a station on the ground able to communicate the optimized slope $\gamma_o$ to the aircraft AC. The optimized slope $\gamma_o$ could be transmitted from the optimized ground slope determination device 6 to the FMS, or even be entered manually in the FMS by pilots.

Moreover, the aircraft guidance system 7 comprises:

A piloting instructions calculation device 11 being intended for determining, usually, piloting instructions from information received from the optimized ground slope determination device 6 via the link L8;

at least one device for aiding piloting, for example, an automatic piloting device 12 and/or a flight director, determining, from the piloting instructions received from said piloting instructions calculation device 11, piloting instructions of the aircraft AC; and control surface actuators 13 for actuating controlled organs, such as for instance (direction, depth) control surfaces of the aircraft, to which the thus determined piloting instructions are applied.

Furthermore, it could be contemplated that the determination of the optimized ground slope $\gamma_o$ and guiding the aircraft along the path A with a slope $\gamma_o$ are optional, providing activation and deactivation functions of such operations as, for instance, an activation device integrated into the cockpit of the aircraft AC.

In addition, it could also be provided that an indication should be displayed inside the cockpit (for instance) as a visual signal for notifying the pilots that the method for optimizing the landing according to this invention is activated. Thereby, pilots will not be surprised by a later interception of the increased slope approach path A with respect to that relating to conventional approaches (ground slope equal to −3°).

The invention claimed is:

1. A method for optimizing the landing of an aircraft on a runway, the landing comprising an approach phase, which is defined by an approach path to be tracked with which there is associated a predefined ground slope, and a flaring phase, the method comprising:

defining a target vertical speed in relation to the ground to be applied to the aircraft upon the initiation of the flaring phase on the basis of performances and characteristics specific to the aircraft;

determining, by an optimized ground slope determining device, as a function of the target vertical speed and of at least one outside parameter, an optimized ground slope associated with the approach path, which is higher than or equal to the predefined ground slope, and guiding the aircraft, by an aircraft guidance system, upon the interception by the aircraft with the approach path, to track the determined optimized ground slope associated with the approach path and to reach the target vertical speed upon initiation of the flaring phase.

2. The method according to claim 1, wherein the at least one outside parameter is selected from the group consisting of
a calibrated airspeed of the aircraft with respect to the air;
an outside temperature at a standard height;
a horizontal speed of the wind;
an inclination of the runway; and
an altitude of the runway.

3. The method according to claim 1, wherein the optimized ground slope is a function of the target vertical speed, a calibrated airspeed of the aircraft with respect to the air, a horizontal speed of the wind, an outside temperature at a standard height, and an inclination and an altitude of the runway.

4. The method according to claim 3, wherein determining the optimized ground slope comprises taking only part of the horizontal speed of the wind into consideration.

5. The method according to claim 3, wherein determining the optimized ground slope further comprises:
determining a density of the air at the standard height from the outside temperature and from the altitude of the runway;
determining a true speed of the aircraft with respect to the air from the calibrated speed of the aircraft with respect to the air and from the determined density of the air; and
determining the optimized ground slope from the target vertical speed, from the determined true speed, from the horizontal speed of the wind, and from the inclination of the runway.

6. The method according to claim 1, wherein determining the optimized ground slope is obtained through geometric construction of a speed triangle.

7. The method according to claim 1, wherein the target vertical speed is preliminarily defined for each type of aircraft.

8. The method according to claim 1, wherein the optimized ground slope ranges between a predefined lower extreme value and a predefined higher extreme value.

9. A device for optimizing the landing of an aircraft on a runway, said landing comprising an approach phase, defined by an approach path to be tracked with which there is associated a predefined ground slope, and a flaring phase, the device comprising:
an optimized ground slope determining device that determines, as a function of at least one outside parameter and a target vertical speed preliminarily defined from performances and characteristics specific to said aircraft, an optimized ground slope associated with the approach path to be tracked, wherein the optimized ground slope is higher than or equal to the predefined ground slope; and
an aircraft guidance system that guides the aircraft upon the interception of the approach path by the aircraft so that the aircraft tracks the optimized ground slope associated with said approach path and the aircraft reaches the target vertical speed upon initiation of the flaring phase.

10. The device according to claim 9, wherein the optimized ground slope determining device determines the optimized ground slope as a function of said target vertical speed, a calibrated airspeed of the aircraft with respect to the air, a horizontal speed of the wind, an outside temperature at the standard height, and an inclination and an altitude of the runway.

11. An aircraft, comprising:
a device on the aircraft for optimizing the landing of an aircraft on a runway, said landing comprising an approach phase, defined by an approach path to be tracked with which there is associated a predefined ground slope, and a flaring phase, the device comprising:
an optimized ground slope determining device that determines, as a function of at least one outside parameter and a target vertical speed preliminarily defined from performances and characteristics specific to said aircraft, an optimized ground slope associated with the approach path to be tracked, wherein the optimized ground slope is higher than or equal to the predefined ground slope; and
an aircraft guidance system that guides the aircraft upon the interception of the approach path by the aircraft so that the aircraft tracks the determined optimized ground slope associated with said approach path and the aircraft reaches the target vertical speed upon initiation of the flaring phase.

12. The method according to claim 8, wherein the predefined lower extreme value equals $-3°$ and the predefined higher extreme value equals $-4.49°$.

13. The device according to claim 10, wherein the optimized ground slope determining device further comprises:
an air density calculator that calculates a density of the air at the standard height from the outside temperature and from the altitude of the runway;
a true speed calculator that calculates a true speed of the aircraft with respect to the air from the calibrated speed of the aircraft with respect to the air and from the determined density of the air; and
an optimized ground slope calculator that calculates the optimized ground slope from the target vertical speed, from the determined true speed, from the horizontal speed of the wind, and from the inclination of the runway.

14. The method of claim 2, wherein the horizontal speed of the wind is obtained by measuring the wind at the level of a control tower of the runway, without taking gusts into consideration.

15. The method of claim 2, wherein the horizontal speed of the wind is obtained by retrieving data measured directly by one or more other aircrafts located in the vicinity of the runway.

* * * * *